United States Patent [19]

Cella

[11] 4,223,122

[45] Sep. 16, 1980

[54] MOISTURE CURABLE ORGANOPOLYSILOXANES

[75] Inventor: James A. Cella, Clifton Park, N.Y.

[73] Assignee: General Electric Company, Schenectady, N.Y.

[21] Appl. No.: 68,635

[22] Filed: Aug. 22, 1979

Related U.S. Application Data

[63] Continuation of Ser. No. 927,289, Jul. 24, 1978, Pat. No. 4,176,111.

[51] Int. Cl.$^2$ .............................................. C08G 77/04
[52] U.S. Cl. ...................................... 528/30; 528/32; 528/40; 528/43
[58] Field of Search ...................... 528/30, 32, 40, 43

[56] References Cited

U.S. PATENT DOCUMENTS 4,176,111  11/1979  Cella .................................. 260/375 B Primary Examiner—Paul F. Shaver
Attorney, Agent, or Firm—William A. Teoli; James C. Davis, Jr.

[57] ABSTRACT

Organopolysiloxanes are provided having terminal 1,3-dicarbonyl cyclic organo siloxy units curable to the solid elastomeric state upon exposure to moisture under ambient conditions. The moisture curable organopolysiloxanes are useful as encapsulants, caulking compounds, adhesives, etc.

2 Claims, No Drawings

MOISTURE CURABLE ORGANOPOLYSILOXANES

This application is a continuation of application Ser. No. 927,289, filed July 24, 1978, now U.S. Pat. No. 4,176,111.

BACKGROUND OF THE INVENTION

The present invention relates to moisture curable organopolysiloxanes having terminal 1,3-dicarbonyl cyclic organosiloxy units.

Prior to the present invention, one package moisture curable organo polysiloxane compositions consisting essentially of chemically combined units of the formula,

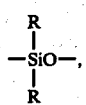
(1)

where R is a monovalent organic radical, generally had an organo silyl functional unit sensitive to atmospheric moisture, such as silylacyloxy unit, a silylketoximato unit, silylaminoxy unit, etc. These moisture sensitive organopolysiloxane compositions were generally maintained as a pigmented moisture-free reinforced mixture in a moisture resistant collapsible tube. Cure of the flowable organopolysiloxane was effected when the flowable mixture was applied onto a substrate under atmospheric conditions. In some instances it took several hours before the mixture attained a tack-free condition while in other situations the cure of the mixture was accompanied by an unpleasant amine odor or acid odor, such as acetic acid. In other situations, for example, when the organopolysiloxane contained chemically combined silylketoimato units, corrosion and metallic surfaces often occurred.

It would be desirable to overcome the aforementioned undesirable shortcomings of one package room temperature vulcanizing organopolysiloxane compositions by providing a one package organopolysiloxane composition capable of being converted from a flowable state to an elastomeric state upon exposure to atmospheric moisture to produce a tack-free elastomer within about one hour or less and cured organopolysiloxane elastomer within 24 hours without the generation of amine or acid byproducts causing undesirable odor and metal contamination.

STATEMENT OF THE INVENTION

The present invention is based on the discovery that certain silylethers of 1,3-dicarbonyl cyclic silanes of the formula,

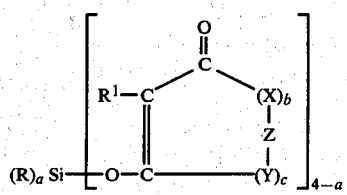
(2)

which are further described in my copending application Ser. No. 927,288, filed July 24, 1978 and assigned to the same assignee as the present invention, can be employed in combination with silanol-terminated polydiorganosiloxane, to produce moisture curable organopolysiloxanes having terminal 1,3-dicarbonyl cyclic organosiloxy units, where R is a monovalent $C_{(1-13)}$ organic radical, and preferably a $C_{(4-12)}$ alkyl radical, $R^1$ is a monovalent radical selected from hydrogen, halogen and R, X and Y are divalent radicals selected from —O—, —S— and

where b and c are 0 or 1, Z is a divalent $C_{(1-13)}$ organic radical selected from alkylene, cycloalkylene, arylene and a fused ring structure, $R^2$ is a monovalent radical selected from hydrogen and R, and a is equal to 0 to 2.

Radicals included by R of formula (1) are, for example, aryl radicals and halogenated aryl radicals, such as phenyl, chlorophenyl, xylyl, tolyl, etc.; aralkyl radicals, such as phenylethyl, benzyl, etc.; alkyl and alkenyl radicals, such as methyl, ethyl, propyl, butyl, pentyl, vinyl, etc.; cycloalkyl, such as cyclopentyl, cyclohexyl, cycloheptyl, etc.; cyanoalkyl, such as cyanoethyl, cyanopropyl, etc.; fluoroalkyl, such as fluoropropyl, etc. In formulas (1) and (2), where R and $R^2$ can represent more than one radical, these radicals can be the same or different.

The curable organopolysiloxane compositions of the present invention consist essentially of chemically combined units of formula (1), and have terminal 1,3-dicarbonyl cyclic organosiloxy units of the formula,

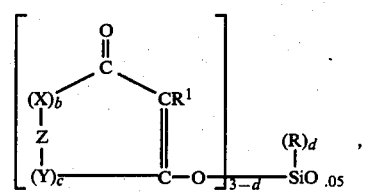
(3)

where R, $R^1$, X, Y and Z are as previously defined and d is equal to 0 or 1, can be made by employing the 1,3-dicarbonyl cyclic silanes of formula (2) with silanol terminated organopolysiloxanes of the formula,

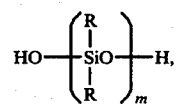
(4)

where m is an integer having an average value of to about 5–3000 inclusive.

There are included by the 1,3-dicarbonyl cyclic silanes of formula (2) compounds such as

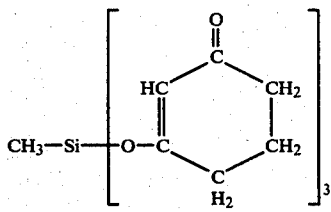

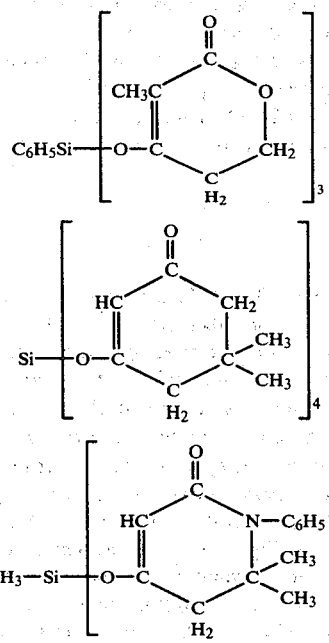

As described in my copending application Ser. No. 927,288, 1,3-dicarbonyl cyclic silanes of formula (2) can be made by effecting reaction between an organohalosilane of the formula, $$(R)_a SiQ_{4-a}, \tag{5}$$

and a 1,3 dione of the formula,

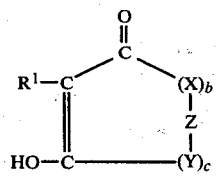

(6)

in the presence of an acid acceptor, where R, R$^1$, X, Z, Y, a, b and c are as previously defined and Q is a halogen radical such as chloro. Preferably, the organohalosilanes of formula (5) utilized to make the 1,3-dicarbonyl cyclic silanes of formula (2) are alkylhalosilanes of the formula, $$R^3 SiQ_3, \tag{7}$$

where Q and a are as previously defined and R$^3$ is a C$_{(4-12)}$ alkyl radical such as butyl, pentyl, hexyl, heptyl, octyl, nonyl, decyl, etc.

Silanol-terminated organo polysiloxanes of formula (4) preferably have a viscosity in the range of from about 2000 to 50,000 centipoises when measured at 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated diorganopolysiloxane of formula (3) are well known. For example, hydrolysis of diorganohalosilane such as dimethyldichlorosilane, diphenyldichlorosilane, methylvinyldichlorosilane, etc., or mixtures thereof can provide for the production of low molecular weight hydrolyzate. Equilibration thereafter can provide for higher molecular weight organopolysiloxane. Equilibration of cyclopolysiloxane such as hexamethylcyclotrisilane, octamethylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined units of formula (1) with steam under pressure. Other methods that can be employed to make silanol-terminated organopolysiloxanes are more particularly described in U.S. Pat. No. 2,607,792, Warrick and U.K. Pat. No. 835,790.

Various fillers and pigments can be incorporated in the silanol-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, etc. The amounts of filler used can obviously be varied within wide limits in accordance with the intended use. For example, in some sealant applications, the curable compositions of the present invention can be used free of filler. In other applications, such as the employment of the curable composition for making binding material, such as 700 parts or more of filler, per 100 parts of organopolysiloxane can be employed. In such applications, the filler can consist of a major amount of extending materials, such as ground quartz, polyvinylchloride, etc., or mixtures thereof, preferably having an average particle size in the range of from about 1 to 10 microns. The compositions of the present invention also can be employed as construction sealants, caulking compounds, etc. The exact amount of filler therefore, will depend upon such factors as the application for which the organosiloxane composition is intended, the type of filler utilized (that is, the density of the filler, its particle size, etc.) Preferably, a proportion of from 10 to 300 parts of filler, which can include up to about 35 parts of a reinforcing filler, such as fumed silica filler, per 100 parts of silanol-terminated organopolysiloxane is utilized. In addition, the curable organopolysiloxane compositions of the present invention also can contain curing accelerators such as dibutyltindilaurate, carboxylic acid salts of lead or zinc, etc.

In the practice of the invention, the curable organopolysiloxane compositions of the present invention can be made by mixing 0.5 to 50 parts of the silyl ether of formula (2), per 100 parts of silanol terminated organopolysiloxane under substantially anhydrous conditions. The order of addition of the various ingredients is not ciritcal. For example, the curing agent can be mixed directly with the silanol-terminated organopolysiloxane, followed by the addition of filler, or the curing agent can be added to the mixture of filler and the silanol-terminated organopolysiloxane, etc. Optimum results have been achieved, if the resulting mixture has not more than 100 parts of water, per million parts of mixture. Preferably, mixing is accomplished in a temperature between 20° C. to 80° C.

After the curable organopolysiloxane composition is made, it can be stored for a substantial period of time if properly protected from moisture. The curable organopolysiloxane composition can remain in a fluid curable state for periods of two years or more if maintained at temperatures to 60° C. under substantially anhydrous conditions.

In order that those skilled in the art will be better able to practice the invention, the following examples are given by way of illustration and not by way of limitation. All parts are by weight.

EXAMPLE 1

A solution of 15.1 parts of 2-methylcyclohexane-1,3-dione in about 500 parts of dry toluene was refluxed to effect the removal of water from the mixture by azeotropic distillation. There was added to the resulting solution, after it had been allowed to cool, about 16 parts of dry triethylamine, followed by 7.3 parts of methyltrichlorosilane. The resulting mixture was then stirred for two hours. The mixture was filtered to effect the removal of triethylamine hydrochloride and then stripped of solvent. There was obtained 15.4 parts of a brown solid or a yield of 95%. The product was methyl tris-2-methylcyclohexane-1,3-dione-3-yl-silane having the formula,

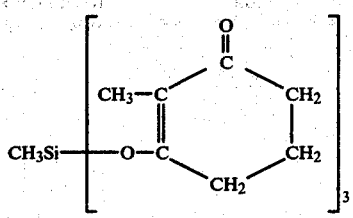

The identity of the product was further confirmed by its infrared spectrum.

A moisture curable organopolysiloxane composition was prepared by blending under substantially anhydrous conditions, 6 parts of the above 1,3-dicarbonyl silyl ether with 100 parts of silanol-terminated polymethylsiloxane having a viscosity of about 35,000 centipoises at 25° C. and a hydroxy content of 0.09% by weight, 20 parts of fumed silica and 1 part of dibutyltindilaurate. The composition cured to a tack-free state when allowed to rest under atmospheric conditions for about 1 hour. A complete cure was achieved in about 20 hours under atmospheric conditions. The product was substantially odor free during cure.

EXAMPLE 2

The procedure of Example 1 was repeated, except that in place of 2-methylcyclohexane-1,3-dione, there was used cyclohexane-1,3-dione. It was found that the resulting moisture curable organopolysiloxane composition made in accordance with the procedure of Example 1, also produced a tack-free elastomer after 15 minutes exposure to atmospheric conditions; a completely cured elastomeric product was obtained in only 3 hours. In addition, the composition was substantially odor free during cure.

EXAMPLE 3

There was added 151.25 parts of dodecyltrichlorosilane to a stirred solution of 210 parts of cyclohexan-1,3-dione and 156.5 parts of triethylamine in 3,140 parts of dry toluene. The mixture was stirred at reflux for 1 hour and filtered. There was obtained 263 parts of product after solvent removal. Based on method of preparation, the product was a 1,3-dicarbonylsilyl ether of the formula,

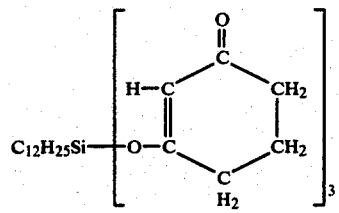

A mixture of 6 parts of the above 1,3-dicarbonylsilylether and 100 parts of silanol terminated polydimethylsiloxane was prepared as described in Example 1. The resulting room temperature vulcanizing composition was compared to the room temperature composition of Example 2 with respect to how long the mixtures were workable after being exposed to atmospheric conditions. The "work life" test was performed by allowing equal parts of the respective room temperature vulcanizing mixtures to rest under atmospheric conditions until the mixtures formed a skin while in an aluminum cup. The mixtures were then difficult to work with a spatula. It was found that the worklife of the mixture having chemically combined dodecyl siloxy units was about 3-5 minutes, while the work life of the methyl-substituted siloxy containing 1,3-dicarbonyl units was approximately 0.5 to 1 minute. This work life test showed that the 1,3-dicarbonylsilylether silane advantageously extended the period of use of the resulting room temperature vulcanizing mixture.

Although the above examples are directed to only a few of the very many variables included within the scope of the present invention, it should be understood that the present invention is directed to a much broader variety of moisture curable compositions based on the use of 1,3-dicarbonyl cyclic silanes of formula (2) and silanol terminated organopolysiloxanes of formula (4).

In Cella et al. copending applications Ser. Nos. 927,287, filed Apr. 24, 1978 and 927,289, filed Apr. 24, 1978, now U.S. Pat. No. 4,176,112 and both assigned to the same assignee as the present invention, there is shown the synthesis of alkoxy-substituted 1,3-dicarbonyl cyclic silanes and the use of these alkoxy silanes with silanol-terminated organopolysiloxane to produce moisture curable organopolysiloxanes having improved cure characteristics.

What I claim as new and desire to secure by Letters Patent of the United States is:

1. Moisture curable organopolysiloxane compositions comprising an organopolysiloxane consisting essentially of chemically combined units of the formula,

and having terminal siloxy units of the formula,

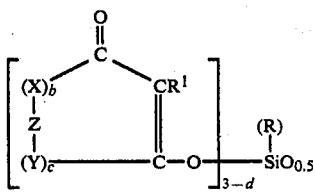

where R is a fluoroalkyl radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^2$ is selected from hydrogen and R, and d is a whole number having a value of 0 or 1.

2. Moisture curable organopolysiloxane compositions comprising an organopolysiloxane consisting essentially of chemically combined units of the formula, $$-\underset{R}{\overset{R}{\underset{|}{Si}}}O-,$$

and having terminal siloxy units of the formula,

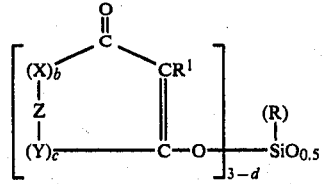

where R is a fluoropropyl radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^2$ is selected from hydrogen and R and d is a whole number having a value of 0 or 1.

* * * * *